(12) United States Patent
Bruce

(10) Patent No.: US 9,931,936 B2
(45) Date of Patent: Apr. 3, 2018

(54) ENERGY MANAGEMENT SYSTEM FOR A NON-RAILBOUND VEHICLE

(71) Applicant: VOLVO TRUCK CORPORATION, Göteborg (SE)

(72) Inventor: Maria Bruce, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 135 days.

(21) Appl. No.: 14/787,249

(22) PCT Filed: May 8, 2013

(86) PCT No.: PCT/EP2013/001365
§ 371 (c)(1),
(2) Date: Oct. 26, 2015

(87) PCT Pub. No.: WO2014/180488
PCT Pub. Date: Nov. 13, 2014

(65) Prior Publication Data
US 2016/0114683 A1    Apr. 28, 2016

(51) Int. Cl.
*B60L 1/00* (2006.01)
*B60H 1/00* (2006.01)
(Continued)

(52) U.S. Cl.
CPC .......... *B60L 1/003* (2013.01); *B60H 1/00642* (2013.01); *B60L 1/00* (2013.01);
(Continued)

(58) Field of Classification Search
CPC ...... B60L 1/00; B60L 11/123; B60L 11/1801; B60L 11/182; B60L 15/2045; B60L 5/36;
(Continued)

(56) References Cited

U.S. PATENT DOCUMENTS

| 5,582,262 A | 12/1996 | Wust | |
|---|---|---|---|
| 6,242,873 B1 * | 6/2001 | Drozdz | B60K 6/46 180/65.1 |

(Continued)

FOREIGN PATENT DOCUMENTS

| CN | 1341063 A | 3/2002 |
|---|---|---|
| CN | 2621979 Y | 6/2004 |
| FR | 2809998 A1 | 12/2001 |
| WO | 2010002644 A1 | 1/2010 |

OTHER PUBLICATIONS

Japanese Official Action (Oct. 27, 2016) (translation) for corresponding Japanese App. 2016-512228.

(Continued)

*Primary Examiner* — Mussa A Shaawat
(74) *Attorney, Agent, or Firm* — WRB-IP LLP

(57) ABSTRACT

An energy management system is provided for a hybrid electric or electric vehicle including an electrical power collector for intermittently collecting electrical power from an external power supply track during driving of the vehicle. The energy management system is arranged to distribute electrical power from the electrical power collector to at least one electrical auxiliary load of the vehicle when collecting electrical power from the external power supply track. The enemy management system includes a control unit configured to control operating characteristics of the at least one auxiliary load depending on if the vehicle operates in a power collecting mode or in a non-power collecting mode.

20 Claims, 8 Drawing Sheets

(51) Int. Cl.
*B60L 11/18* (2006.01)
*B60M 1/12* (2006.01)
*B60L 11/12* (2006.01)
*B60L 15/20* (2006.01)
*B60L 5/36* (2006.01)

(52) U.S. Cl.
CPC ............... *B60L 5/36* (2013.01); *B60L 11/123* (2013.01); *B60L 11/1801* (2013.01); *B60L 11/182* (2013.01); *B60L 11/1816* (2013.01); *B60L 15/2045* (2013.01); *B60M 1/12* (2013.01); *B60L 2200/18* (2013.01); *B60L 2200/36* (2013.01); *B60L 2200/40* (2013.01); *Y02T 10/6217* (2013.01); *Y02T 10/645* (2013.01); *Y02T 10/7005* (2013.01); *Y02T 10/7072* (2013.01); *Y02T 10/7077* (2013.01); *Y02T 10/7283* (2013.01); *Y02T 90/122* (2013.01); *Y02T 90/14* (2013.01); *Y10S 903/904* (2013.01)

(58) Field of Classification Search
CPC .... B60L 1/003; B60L 11/1816; Y02T 10/645; Y02T 10/7077; Y02T 10/7005; Y02T 10/7283; Y02T 10/6217; Y02T 90/14; Y02T 90/122; Y02T 10/7072; B60H 1/00642
See application file for complete search history.

(56) References Cited

U.S. PATENT DOCUMENTS

| | | | |
|---|---|---|---|
| 7,013,205 | B1 | 3/2006 | Hafner et al. |
| 2003/0105562 | A1* | 6/2003 | Hsiao ............... B60L 11/1887 701/22 |
| 2003/0201097 | A1 | 10/2003 | Zeigler et al. |
| 2005/0039630 | A1* | 2/2005 | Kumar ............... B60K 6/46 105/35 |
| 2009/0138149 | A1 | 5/2009 | Chattot |
| 2009/0156068 | A1* | 6/2009 | Barrett ............... B63H 21/20 440/3 |
| 2011/0043165 | A1 | 2/2011 | Kinser et al. |
| 2011/0046828 | A1 | 2/2011 | Chander et al. |
| 2012/0316717 | A1 | 12/2012 | Daum et al. |
| 2013/0138279 | A1* | 5/2013 | Shi ............... B60L 1/00 701/22 |

OTHER PUBLICATIONS

Japanese Official Action (Oct. 27, 2016) (machine translation) for corresponding Japanese App. 2016-512228.
Chinese Official Action (Jan. 4, 2017) for corresponding Chinese App. 201380076401.9.
International Search Report (Mar. 7, 2014) for corresponding International App. PCT/EP2013/001365.
International Preliminary Report on Patentability (Sep. 28, 2015) for corresponding International App. PCT/EP2013/001365.

* cited by examiner

ENERGY MANAGEMENT SYSTEM FOR A NON-RAILBOUND VEHICLE

BACKGROUND AND SUMMARY

This disclosure relates to an energy management system for a hybrid electric or electric non-railbound vehicle comprising an electrical power collector for intermittently collecting electrical power from an external power supply track during driving of the vehicle, wherein the energy management system is arranged to distribute electrical power from the electrical power collector to at least one electrical auxiliary load of the vehicle when collecting electrical power from the external power supply track. The disclosure also relates to a method for controlling operating characteristic of at least one auxiliary load of a hybrid electric or electric vehicle comprising an electrical power collector for intermittently collecting electrical power from an external power supply track during driving of the vehicle. The vehicle propulsion system and corresponding method may be implemented in many types of road and off-road vehicles, such as trucks, busses, cars, construction vehicles, and the like.

Hybrid-electric vehicles having a combustion engine and an electrical traction machine have a limited driving range and it is known for example from FR2809998 to provide the hybrid-electric vehicle with an electrical power collector for collecting electrical power from an external power supply track, thereby enabling the vehicle to be driven in a pure electric mode. This aspect consequently increases the propulsion flexibility, increases the driving range and reduces emissions. Known energy management systems for this type of vehicles are however still not fully developed and further improvements in performance and cost-saving are possible.

It is desirable to provide an improved energy management system for a hybrid electric or electric non-railbound vehicle comprising an electrical power collector for intermittently collecting electrical power from an external power supply track during driving of the vehicle.

The disclosure concerns an energy management system for a hybrid electric or electric vehicle comprising an electrical power collector for intermittently collecting electrical power from an external power supply track during driving of the vehicle, the energy management system is arranged to distribute electrical power from the electrical power collector to at least one electrical auxiliary load of the vehicle when collecting electrical power from the external power supply track.

The disclosure is characterized in that the energy management system comprises a control unit configured to control operating characteristic of the at least one auxiliary load depending on if the vehicle operates in a power collecting mode or in a non-power collecting mode.

The disclosure also concerns a method for controlling operating characteristic of at least one auxiliary load of a hybrid electric or electric vehicle comprising an electrical power collector for intermittently collecting electrical power from an external power supply track during driving of the vehicle, wherein electrical power may be distributed from the electrical power collector to the at least one electrical auxiliary load of the vehicle when collecting electrical power from the external power supply track, the method comprising the steps of determining if the vehicle operates in a power collecting mode or in as non-power collecting mode; and controlling operating characteristic of the at least one auxiliary load depending on if the vehicle operates in a power collecting mode or in a non-power collecting mode.

Energy management during slide-in driving is about using the available energy in the most efficient way in order to fulfil the vehicle needs to be able to perform the propulsion and to run auxiliaries in a satisfactory way. Different energy handling strategies is possible depending on the conditions of the vehicle as well as of how the vehicle is equipped. This invention is about how to utilize the available grid energy in a more efficient way which means that you may in the long run save fuel and/or battery energy/usage.

The core of the disclosure is to control the operating characteristic of the vehicle auxiliary loads depending on whether the vehicle collects electrical power from the external grid or not. The thought behind the control strategy is that energy supplied from the power supply track can be regarded as having a lower cost per energy unit compared with energy taken from a vehicle on-board combustion engine or an on-board electrical storage system, such as batteries or super capacitors. The lower cost is partly due to the low efficiency of the conventional gasoline or diesel combustion engines, which effectively use only about 15%-20% of the fuel energy content for propulsion and powering auxiliaries. Electric drive vehicles however, due to the high efficiency of the electrical motor, typically have on-board efficiencies of around 80%. Also, by using electrical energy from the power supply track instead from the on-board battery eliminates any charge and discharge energy losses that otherwise inherently occurs when using the on-board battery.

Conventional powering an electrical propulsion system and electrical auxiliary loads using electrical power from the power supply track when available results in a first energy saving effect. This disclosure aims at further increasing the first energy saving effect by specific control the energy usage of the auxiliary devices, depending on if the vehicle operates in a power collecting mode or in a non-power collecting mode. The specific control enables improved energy efficiency. For example, based on the fact that energy from the power supply track has a lower cost, the inventive control strategy may involve using the auxiliary load relatively more when the system is connected to the external power supply track, compared with a normal usage level during driving in corresponding circumstances and without collecting power from the grid. This strategy will result in overall reduced energy consumption if the auxiliary loads are associated with some kind of energy storage capacity. If for example the auxiliary load is an electrical motor driving an air compressor unit for filling the vehicle air tanks, the relatively cheap energy from the power supply track may be excessively used in a power collecting mode for temporarily storing the relatively low-cost energy on the vehicle for later use. Important is also that the energy storage system does not exhibit a significant energy-loss at charging, storing and discharging phases, because this aspect may then consume the cost-saving effect of the disclosure. For example, temporarily lowering the temperature in a storage compartment of a refrigerator truck will generally result in an increased energy loss due to increased thermal loss through the walls of the storage compartment. Consequently, most preferably, the additional energy from the power supply track is stored and subsequently used without significantly increasing the total amount of power consumption.

The control unit may be configured to increase the total power consumption level of the at least one auxiliary load when operating the vehicle in a power collecting mode, compared with the total power consumption level of said at least one auxiliary load when operating the vehicle in corresponding circumstances in a non-power collecting mode. This control strategy delivers the desired improved energy efficiency discussed above.

The energy management system may be arranged to charge an energy storage devices associated with the at least one electrical auxiliary load of the vehicle to a predetermined maximal level when collecting electrical power from the external power supply track. Charging the energy storage device using relatively low-cost energy from the external power supply track enables storage of that low-cost energy on-board the vehicle for later use, thereby reducing the level of energy required from the on-board combustion engine, such that overall fuel-efficiency is improved.

The energy storage devices may be charged by filling an air storage tank with compressed air, filling a hydraulic accumulator with pressurised hydraulic fluid, lowering the temperature of a cargo refrigerator compartment, or by increasing or decreasing the temperature of a driver's cabin depending on the circumstances The energy management system may comprise vehicle relative position determining means arranged to determine vehicle position in relation to power supply track availability. The vehicle relative position determining means may be relatively simple and capable of only detecting availability of the power supply track at the current position of the vehicle. A more complex vehicle relative position determining means may have capacity of also calculating the distance and/or time remaining until reaching a start point of a power supply track segment, and/or calculating the distance and/or time remaining until reaching an end point of a power supply track segment. With knowledge of the vehicle position in relation to power supply track availability more intelligent control of the electrical auxiliary loads of the vehicle is enabled.

The vehicle relative position determining means may comprise any of a global positioning system (GPS) in combination with geographical power supply track installation information, a dedicated short-range communication system (DSRC) for communication with the power track installation, or radio-frequency identification (RFID) technology or similar transmitter/responder technology for determining the availability of power supply track at present vehicle position.

The control unit may be configured to estimate a time period until the electrical power collector will start collecting electrical power based on determined vehicle position in relation to start point of power supply track availability. Thereby more intelligent control of the electrical auxiliary loads of the vehicle is enabled.

For example, the control unit may be configured to control operating characteristic of the at least one auxiliary load depending also on if the estimated time period until the electrical power collector will start collecting electrical power from the external power supply track is within a predetermined time window. In particular, the control unit may be configured to decrease the total power consumption level of the at least one auxiliary load when the estimated time period until the electrical power collector will start collecting electrical power from the external power supply track is within a predetermined time window, compared with the total power consumption level of said at least one auxiliary load when operating the vehicle in corresponding circumstances outside said predetermined time window. Thereby relatively expansive energy from the combustion engine may be replaced by relatively low-cost energy from the power supply track.

Furthermore, the control unit may be configured to estimate a time period until the power collector will disconnect from the external power supply track based on determined vehicle position in relation to end point of power supply track availability. Thereby more intelligent control of the electrical auxiliary loads of the vehicle is enabled. For example, the control unit may be arranged to, upon collecting electrical power from the external power supply track during driving of the vehicle, coordinate operation of the at least one electrical auxiliary load with the estimated time period until the power collector will disconnect from the external power supply track and the energy charge level of the associated energy storage device, for enabling the associated energy storage device to attain the predetermined maximal level at time of disconnection from the external power supply track. Thereby a maximal energy saving effect is realised.

The control unit may be arranged to prioritise supply of electrical energy from the electrical power collector to an electrical traction machine of the vehicle, and to limit the supply of electrical energy from the electrical power collector to the at least one electrical auxiliary load to prevent that a maximal permitted power transmission level of the power collector or a maximal permitted electrical load level of the power supply track is exceeded. The propulsion function of the vehicle is prioritised because propulsion generally corresponds to the largest load of the vehicle, and replacing the largest load with low-cost energy from the power supply track generally results in the largest cost savings.

The electrical auxiliary load may be formed by an electrical heating device for heating an electrical storage system, a driver's cabin, a vehicle seating, a vehicle window, a vehicle steering wheel, or a vehicle side mirror. An electrical heating device may also be considered as an energy storage device but with a relatively high energy loss rate.

The electrical auxiliary load may be formed by any of an electrical machine driving an air compressor unit/pump, an electrical machine driving as compressor unit of a vehicle air conditioning system, a vehicle electrical power take-off for operating at least one electrical load located on the vehicle or a trailer connected to the vehicle, or an electrical machine driving, a water cooling system or air cooling system of the vehicle.

The electrical auxiliary load may be formed by an electrical machine driving a hydraulic pump of a hydraulic system. The hydraulic system may comprise a hydraulic motor for propulsion of the vehicle, a hydraulic cylinder for operating an implement of the vehicle, a hydraulic cylinder for steering of an articulated vehicle, or a hydraulic accumulator for temporarily storing hydraulic energy.

The electrical power collector may be arranged to collect electrical power while being in sliding contact with an electrical conductor of the power supply track, or by inductive coupling between the electrical power collector and the power supply track.

In addition to above, the disclosure concerns a corresponding method.

BRIEF DESCRIPTION OF DRAWINGS

In the detailed description of the disclosure given below reference is made to the following figure, in which.

DETAILED DESCRIPTION

Various aspects of the disclosure will hereinafter be described in conjunction with the appended drawings to illustrate and not to limit the disclosure, wherein like designations denote like elements, and variations of the inventive aspects are not restricted to the specifically shown embodiments, but are applicable on other variations of the disclosure.

Figure 1:
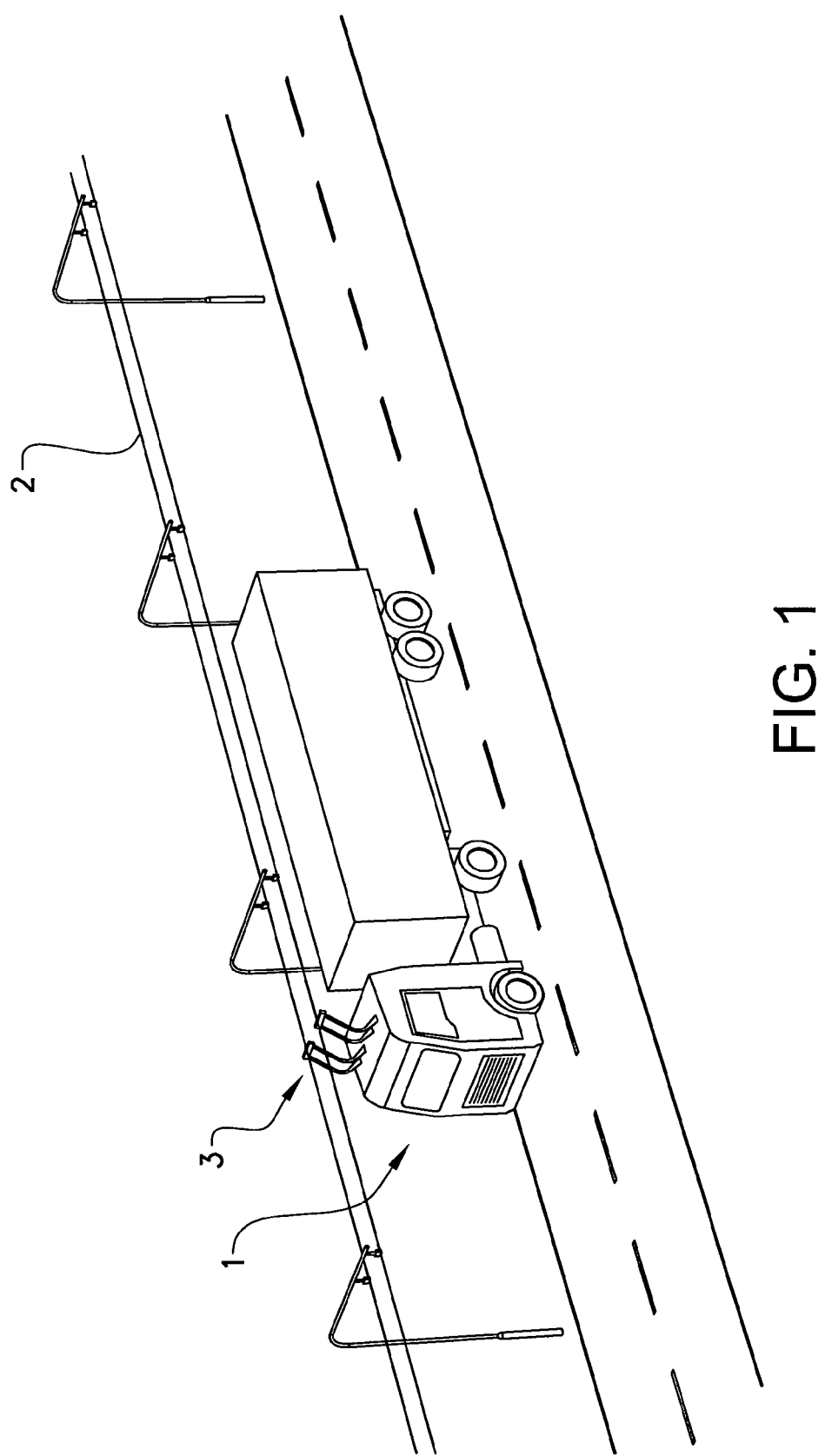
FIG. 1 shows a vehicle electrically connected to an overhead power supply track.

FIG. 1 shows a typical example where the present disclosure advantageously can be implemented. A non-rail-bound vehicle 1, such as a truck, having a hybrid electric or pure electric propulsion system is illustrated being slidingly connected to an external power supply track 2 by means of a power collector 3 fastened to the vehicle 1. The power supply track 2 is normally not available over the entire travel path of the vehicle 1 and the power collector 3 of the vehicle 1 must consequently be configured for intermittently collecting electrical power from the power supply track 2 at those segments of the travel path where the power supply track 2 is available. The electrical power collector 3 is configured for collecting electrical power from the external power supply track 2 during driving and stiilstand of the vehicle 1. The electrical power collector 3 is further preferably arranged to initiate and end collection of electrical power from the external power supply track 2 both during driving and still stand of the vehicle 1. The power supply track 2 comprises at least two separate conductors for supplying DC or AC to the vehicle 1. When the power supply track 2 is located above the vehicle 1, as in FIG. 1, electrical power collector 3 may be designed as a pantograph. Two separate pantographs arranged side-by-side may be arranged to individually contact one of two separate conductors.

Figure 2:
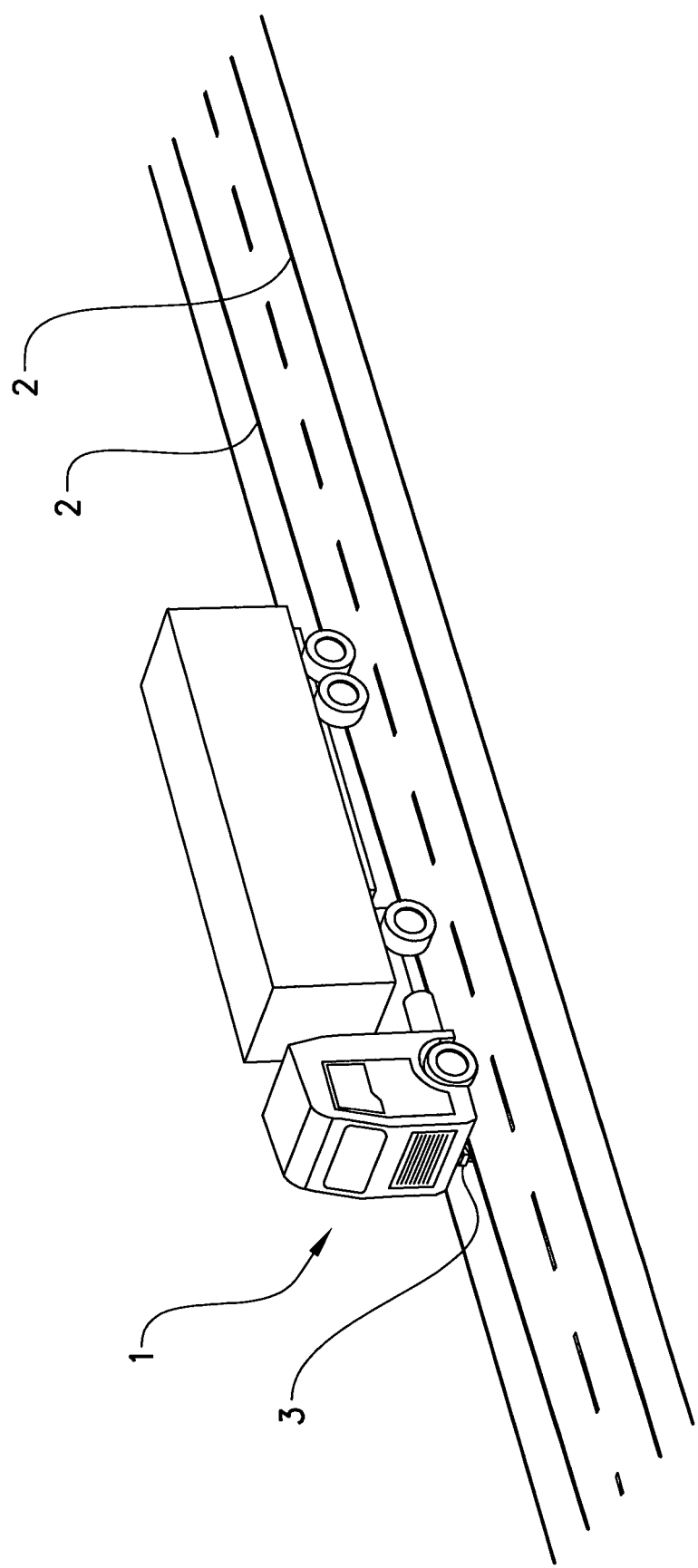
FIG. 2 shows a vehicle electrically connected to an embedded power supply track.

An alternative arrangement of the power supply track 2 is shown in FIG. 2, where the power supply track 2 is provided embedded in the road, and where a sliding electrical, contact may be established between a power collector 3 mounted under the vehicle 1 and the power supply track 2. This solution has a relatively low installation cost, is robust and enables all types of vehicles to connected to the power supply track, irrespective of the height of the vehicle. However, the disclosure encompasses also other power supply track solutions, such as a power supply track being located sideways of the vehicle 1. Similarly, the electrical power collector 3 may alternatively be arranged to collect electrical power by inductive coupling between the electrical power collector and the power supply track, located for example embedded in the ground. Inductive coupling is based on an electromagnetic field to transfer energy between two objects. Energy is sent through an inductive coupling to an electrical device, which can then use that energy to propel the vehicle propulsion system.

Figure 3:
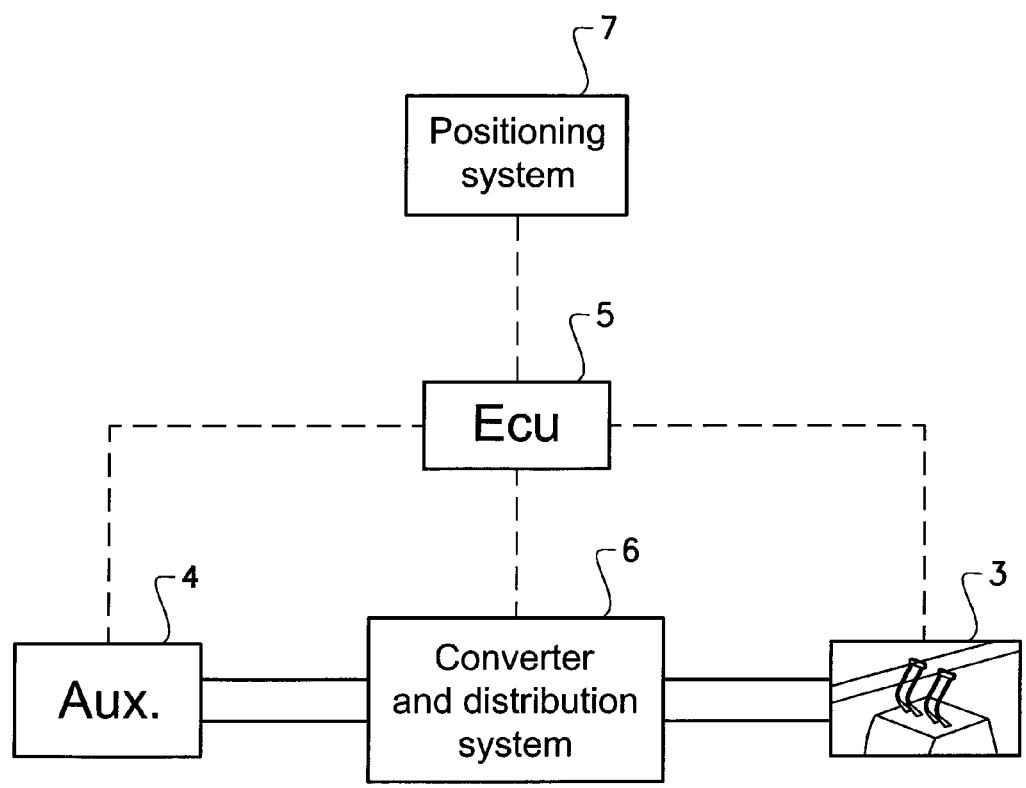
FIG. 3 shows a simplified and schematic layout of the energy management system according to the disclosure.

An energy management system for a hybrid electric or electric vehicle according the present disclosure is schematically illustrated in FIG. 3. The energy management system comprises an electrical power collector 3 for intermittently collecting electrical power from an external power supply track 2 during driving of the vehicle 1. The energy management system is arranged to distribute electrical power from the electrical power collector 3 to at least one electrical auxiliary load 4 of the vehicle when collecting electrical power from the external power supply track 2, where distribution is handled by a converter and distribution system 6. The energy management system further comprises a control unit 5 configured to control operating, characteristic of the at least one auxiliary load 4 depending on if the vehicle operates in a power collecting mode or in a non-power collecting mode.

The energy management system comprises a vehicle relative position determining means 7 for determining vehicle position in relation to power supply track availability. The position determining means typically comprises a global positioning system GPS for determining present geographic positioning information. In addition, the control unit 5 may also have access to stored data concerning geographical location of power supply track installations, such that the control unit 5 can calculate present vehicle position in relation to power supply track availability. The stored data may be stored on the vehicle, or stored on a stationary server or the like and made available by communication means, such as telematics. The stored data concerning location of the geographical power supply track installation may be provided from a supplier, or simply collected by a self-learning system that registers power supply track availability during the first time of registering the power supply track. A plurality of vehicles may then also internally share the registered geographical position of the power supply track. Moreover, with knowledge about the future travel path the control unit 5 can also calculate future vehicle position in relation to power supply track availability. For determining if an external power supply track 2 is available at the present vehicle position, the system may further, or alternatively, include a dedicated short-range communication means for communicating with the power supply track installation, a radio-frequency identification (RFID) technology, or any other similar transmitter/responder technology.

The electrical auxiliary load 4 may be formed by many different types of electrical loads norm ally available on hybrid electric and electric vehicles. For example, the electric auxiliary load 4 may be formed by an electrical heating device. The heating device may for example be suitable for heating an electrical storage system, such as a battery and/or a capacitor. Alternatively, the heating device may for example be suitable for heating a driver's cabin, a vehicle seating, a vehicle window, a vehicle steering wheel, or a vehicle side mirror. Using an electrical heating device to an excessive degree during a connected mode results generally in a reduced need to use the heating device for a certain time period after disconnection from the power supply track, due to the relatively high thermal charge level immediately after charging using power from the electrical power collector. Thereby a cost saving effect may be attained.

The electrical auxiliary load 4 may alternatively be formed by an electrical machine driving an air compressor unit. Compressed air is generally frequently used in commercial vehicles, for example for the braking system, for air suspension system, and for different types of actuating systems, such as for opening doors in buses. The air compressor may be powered by an electrical machine forming an auxiliary load.

The electrical auxiliary load 4 may be formed by an electrical machine driving a compressor unit of a vehicle air conditioning system. Most modern vehicles have an air conditioning system for controlling and regulating temperature of the air within the drive's cabin. Special commercial vehicles, such as trucks transporting perishable freight at relatively low temperatures, may also have a large refrigerator compartment for the freight, which compartment needs a large air conditioning system for attaining the required low temperature. A heat pump for compressing a working fluid is an essential part of the air condition and refrigerator system, which heat pump may be powered by an electrical machine forming an auxiliary load. If for example the truck pulls a trailer having a refrigerator compartment, then the electrical auxiliary load may be formed by a vehicle electrical power take-off, which supplies electrical power for operating at least one electrical load of the trailer.

The electrical auxiliary load 4 may alternatively be formed by an electrical machine driving a water cooling system or air cooling system of the vehicle. Many components of the vehicle gets very warm during use of the vehicle and need cooling for avoiding damage or degraded performance. For example, the engine cooling means may be powered by an electrical machine thrilling an auxiliary load, as well as cooling means for an electrical storage system and/or high power components of a hybrid electric vehicle. The cooling means may be a water cooling pump and an air ventilator.

The electrical auxiliary load 4 may be formed by an electrical machine driving a hydraulic pump of a hydraulic system. Hydraulic systems are common in construction equipment vehicles, such as wheel loaders, excavators, articulated haulers, and the like. The hydraulic system are often used for propulsion, steering and motion of any implement associated with the construction equipment vehicle. A fixed or variable displacement hydraulic pump is commonly used as hydraulic motor for pressurising the hydraulic fluid of the system, and an electrical machine may be used for powering the hydraulic pump. A hydraulic accumulator may also be included in the hydraulic system for temporarily storing hydraulic energy.

Figure 4:
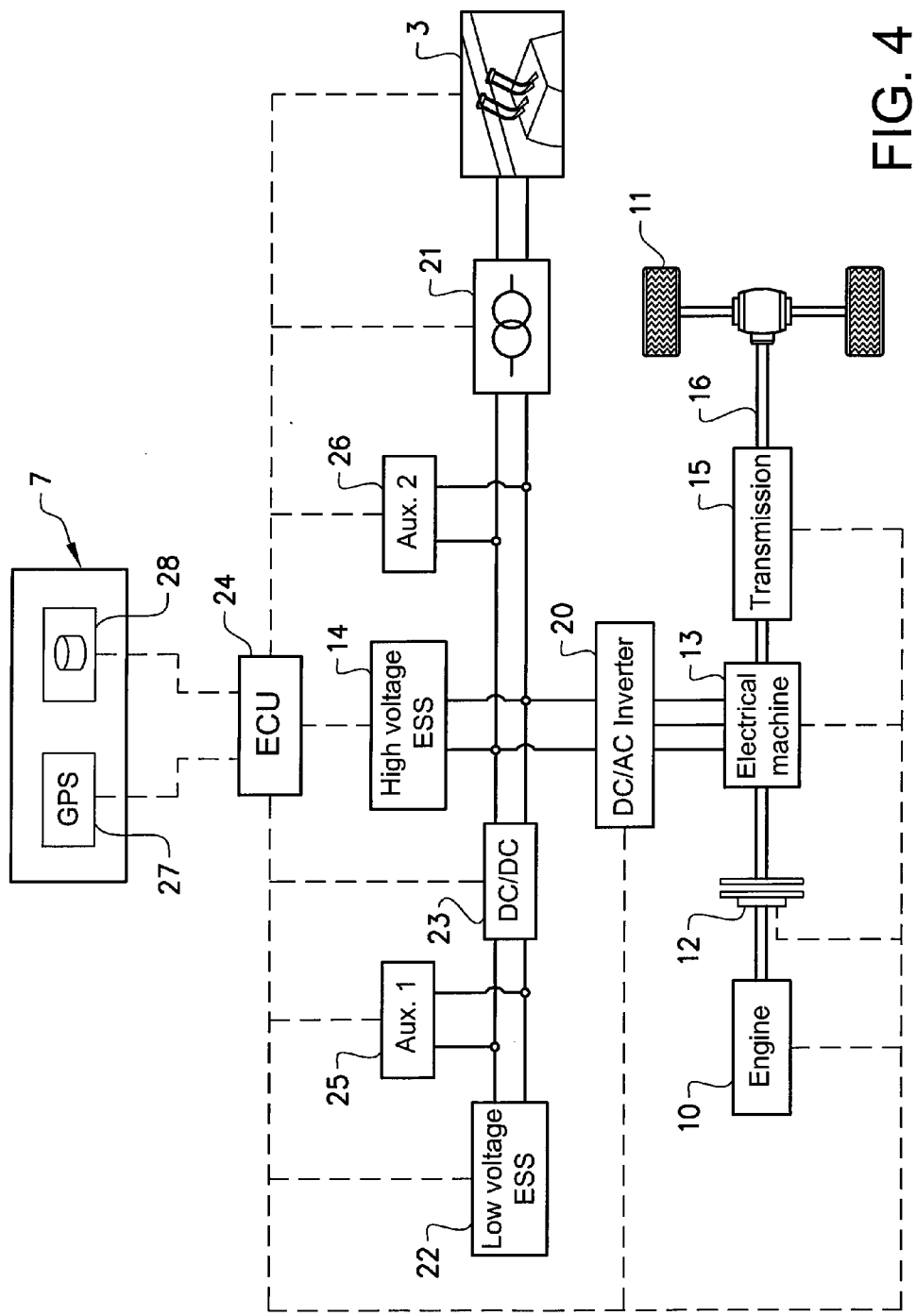
FIG. 4 shows a more detailed schematic layout of the energy management system according to the disclosure.

FIG. 4 discloses a more detailed exemplary layout of an energy management system of a hybrid electric vehicle according to the disclosure. The powertrain comprises a combustion engine 10 drivingly connected to driven wheels 11 via a master clutch 12, which may be an automated friction clutch according to known art. An electric machine 13 is arranged downstream of said master clutch 12 for vehicle propulsion, either jointly with the combustion engine 10 or alone. Said electric machine 13 has a capacity of functioning as a generator for recuperating kinetcal energy during braking and storing the electrical energy in a high voltage electrical storage system 14, having for example an operating voltage of several hundred volts. The high voltage electrical storage system 14 can for example comprise an electric battery and/or a super capacitor, which can be charged or discharged and transmit electric power to and from the electric machine 13 via an AC/DC power converter 20. The electric machine 13 is further drivingly connected to a transmission 15, for example a step geared automatic transmission. The transmission 15 is subsequently connected with said driven wheels 11 via a propeller shaft 16. The vehicle propulsion system is configured to operate the combustion engine 10 when the propulsion system is in a non-collecting mode, i.e. when the vehicle 1 does not collect electrical power from the power supply track 2, and to operate the at least one electrical traction machine 13 in a collecting mode, i.e. when the power collector of the vehicle collects electrical power from the power supply track 2. An electrical power collector 3 arranged for collecting electrical power from the external power supply track 2 is coupled to high voltage electrical storage system 14 via an electrical power transformer unit 21. The electrical power at the external power supply track 2 may have a significantly higher voltage than the voltage level of the high voltage electrical storage system 14, thereby requiring a power transformer unit 21. The hybrid electric vehicle often additionally comprises a low voltage electrical storage system 22 of about 12-48 volt which is connected to the high voltage electrical storage system 14 via a DC/DC converter 23. At least one vehicle system electronic control unit 24 is provided for controlling the parts of the hybrid electric propulsion system. A vehicle relative position determining means 7 may be provided in form of a GPS 27 and a storage device 28 having stored data concerning geographical location of power supply track installations. The energy management system according to the disclosure may of course alternatively with small modifications be used for pure electric vehicle with an electrical storage system as well even if a detailed layout for a pure electrical vehicle is not included in the disclosure.

In FIG. 4 a first electrical auxiliary load 25 is connected to the low voltage electrical storage system 22 and a second electrical auxiliary load 26 is connected to the high voltage electrical storage system 14. Obviously, a plurality of electrical auxiliary loads may be connected to each of the low and high voltage electrical storage systems 22, 14. Most auxiliary loads will likely be connected to the low voltage electrical storage system 22 due to the relatively low power of the auxiliary load, thereby not requiring a more costly high power connection to the high voltage electrical storage system 14.

However, certain high power auxiliary loads are better served being connected to the high voltage electrical storage system because this enables a higher output power and lower current levels, such that thinner and less costly power supply cables may be used.

Figure 5:
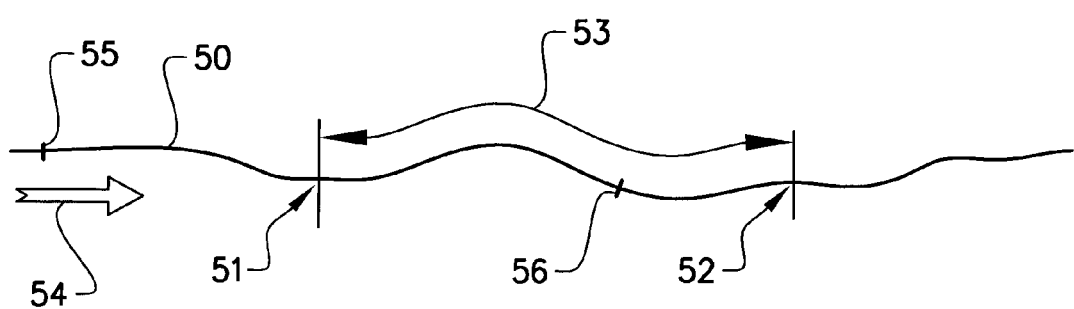
FIG. 5 shows an exemplary travel path with a section having power supply track installation.

The energy management system may have different control strategies for achieving a high cost saving, dependent on the complexity of the energy management system. Examples of the control strategies of the energy management system will hereinafter be described with reference to FIGS. 5-8. FIG. 5 illustrates a typical travel path 50 for a vehicle having a travel direction according to arrow 54. The travel path 50 comprises a first geographical point 51 denoting a start of a power supply track section 53, and a second geographical point 52 denoting an end of the power supply track section 53. The first and second geographical points 51, 52 may be defined in terms of latitude and longitude, or similar systems for determining absolute geographical position. The length of the power supply track section 53 may vary to a large extent but will likely not be shorter than about 500 meters for system to bring any substantial improved performance. Power supply track sections 53 having a length of several kilometers up to several tens of kilometers are considered appropriate.

A less complex vehicle relative position determining means may only be able to determine power supply track availability at present vehicle position, i.e. without necessarily taking into account the present geographical position of the vehicle. This type of vehicle relative position determining means may consequently be able to detect when a power supply track 2 is available and not available, without knowledge of future power supply track availability. The vehicle relative position determining means may for example comprise at least one sensor device that can detect the presence of the power supply track 2. The sensor device may for example comprise one or more cameras for visually identifying the power supply track, sensor devices sensitive to magnetic fields, radar units. The sensor device may alternatively be a dedicated short-range communication means that interact with the power supply track installation.

Figure 6:
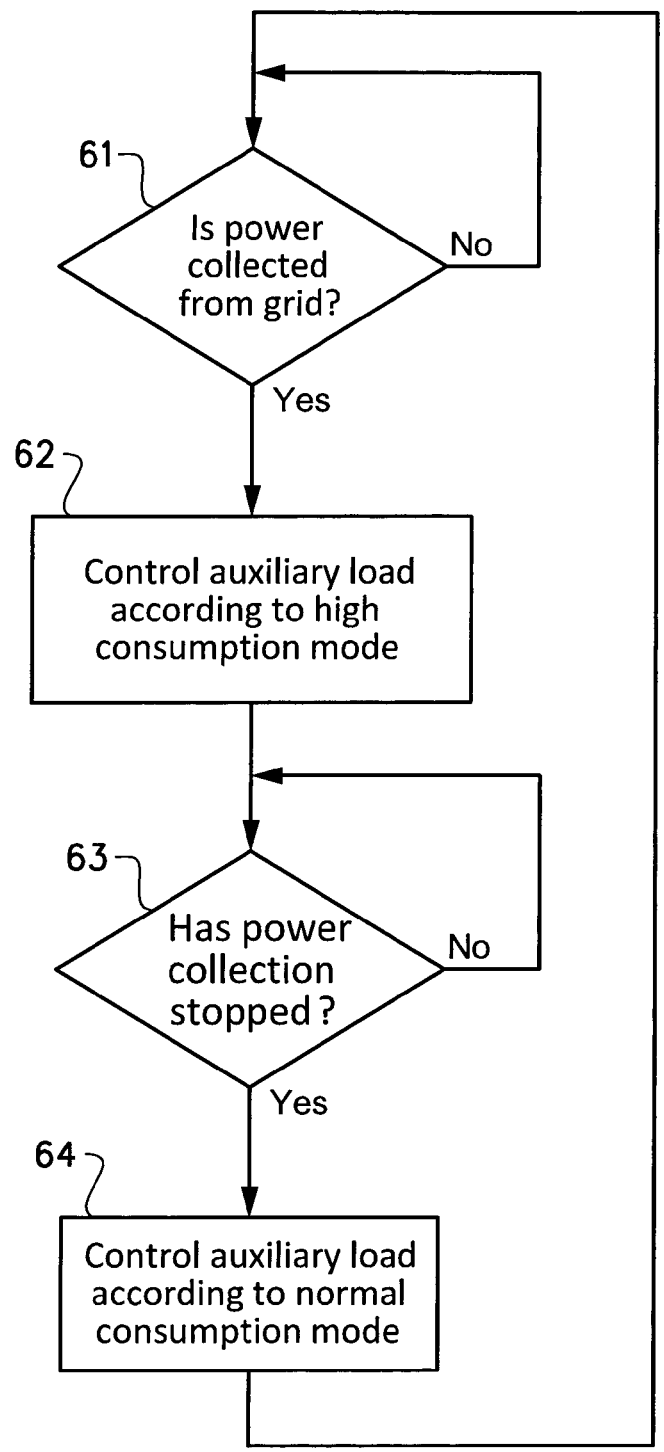
FIG. 6-8 shows schematically control strategies for controlling operating characteristics of the auxiliary load.

A control strategy for controlling the operating characteristics of an auxiliary device 25, 26 of the energy management system using the less complex vehicle relative position determining means is schematically illustrated in conjunction with FIG. 5 and FIG. 6. In a first step 61 of the control method the system investigates if the power collector 3 is collecting electrical energy to the vehicle, typically for operating the main electric propulsion machine 13 of the vehicle. A vehicle having an energy management system according to the disclosure and travelling in the direction of arrow 54 in FIG. 5 will first upon reaching the first geographical point 51 determine availability of the power supply track 2, because the system lacks means to perform estimations of future supply track availability. Upon determining availability of the power supply track 2 the vehicle will start collecting electrical power from the power supply track 2 using the power collector 3, the combustion engine 10 will be stopped and the vehicle propulsion system is propelled by the electrical traction machine 13.

In response to this action the energy management system will go to a second step 62 of the method in FIG. 6, where the control unit 24 controls the auxiliary load 25, 26 according to a high consumption mode. A high consumption mode may typically involve adjustment of the control parameters associated with each of the auxiliary loads 25, 26 to realise a temporarily higher energy consumption of the auxiliary load 25, 26. For example, the temperature target level of the driver's cabin and/or a refrigerator compartment may be increased or decreased one or a few degrees, depending on the circumstances, such that the electrical motor driving the air conditioning unit and refrigeration unit exhibits at least a temporarily increased workload. The minimum air pressure level that triggers operation of the air compressor may be increased, such that the electrical machine driving the air compressor pump exhibits at least a temporarily increased workload. A minimum charge level of a hydraulic accumulator may be increased, such that an electrical motor driving a hydraulic pump for charging the hydraulic accumulator exhibits at least a temporarily increased workload. Electrical heating functions that are currently intermittently or continuously operating may be adjusted to have a higher target value. Thereafter the energy management system will go to a third step 63 of the method in FIG. 6 for determining when power collection from the grid is stopped.

Upon passing the second geographical point 52 the vehicle relative position determining means will determine lack of power supply track 2, and in response thereto the combustion engine 10 will be started and the vehicle propulsion system is propelled by the combustion engine 10. Upon determining that the power collection from the power supply track 2 is stopped, the energy management system will go to a fourth step 64, where the control unit 24 controls the auxiliary load 25, 26 according to a normal consumption mode again.

Figure 7:
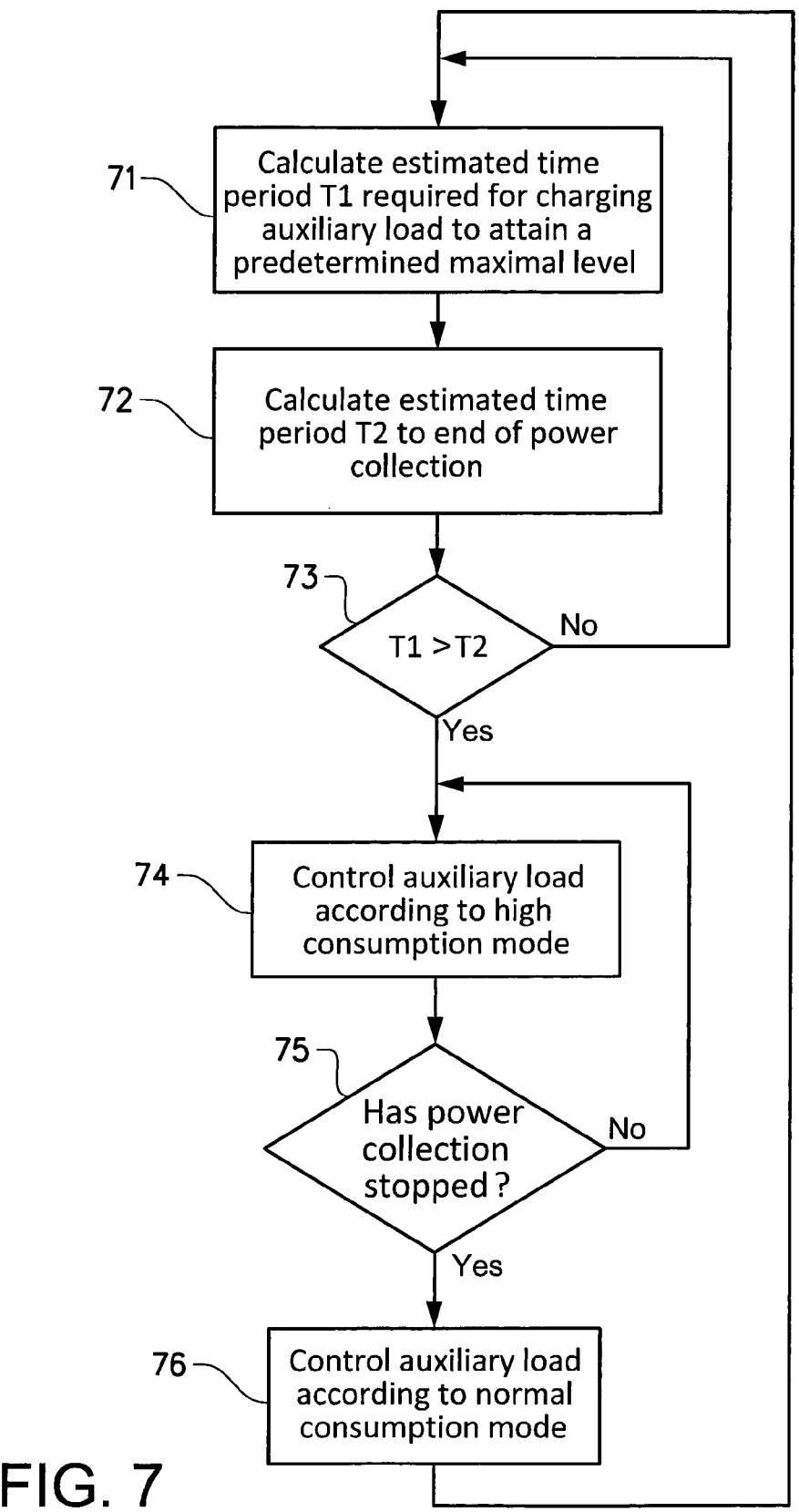

A more complex but also more efficient control strategy is disclosed in FIG. 7 in conjunction with FIG. 5. The vehicle relative position determining means is here able to determine vehicle position in relation to power supply track availability for a certain future time period. For example, a dedicated short-range communication system (DSRC) of the vehicle may communicate with the power track installation for providing forecast information about the distance to the start and/or end of the power track. At least one communication point 55 along the travel path 50 ahead of the power supply track section 53 may supply information concerning length to start and/or end point 51, 52 of the power supply track. Alternatively, the vehicle relative position determining means is able to determine vehicle position in relation to power supply track availability for a complete planned travel path. This may be realised by determining the complete planned travel path of the vehicle, for example based on driver input, determining present vehicle geographical position based on a global positioning system (GPS) or similar system, and using stored data concerning geographical position of power supply track installations. With information about the vehicle position in relation to power supply track availability for a certain future time period, the control unit 24 may be arranged to control operation of the heating system based thereon. As an alternative to GPS and DSRC, travel path recognition based on travel path characteristic may be implemented, or the use the radio-frequency identification (REID) technology or similar transmitter/responder technology.

In a first step 71 of the control strategy, the vehicle has past the start point 51 of the power supply track section 53, operates in a power collecting mode with the combustion engine 10 in a stopped mode and approaches the end of the power supply track 2. The control unit 24 is arranged to calculate an estimated first time period T1 required for charging auxiliary load to attain a predetermined maximal level. The estimated first time period T1 will thus be individual for each auxiliary load 25, 26 and may also change over time. Due care to the upcoming road conditions are also advantageously taken into account when estimating the first time period T1 to foresee any potential electrical power supply shortage from the power supply track 2, for example during uphill road segments, and/or due to an estimated simultaneous operation of multiple auxiliary loads 25, 26. Travel path elevation data may thus be required to determine to the geographical points where power supply shortage from the power supply track is likely to occur. Additional data, such as present vehicle total weight, may advantageously be provided to improve calculation of possible power supply shortage from the power supply track 2.

At a second step 72 the control unit is arranged to calculate an estimated second time period T2 to restart of the engine 10. This calculation may be based on the remaining road distance between the present vehicle location and to the endpoint 52 of the power supply track, historical values for traveling said distance and/or the present and estimated speed of the vehicle. At a third step 73 the control unit compares the first and second time periods T1, T2 and decides to proceed to a fourth step 74 if the first time period T1 is larger than the second time period T2. Otherwise it will return to the first step 71.

At a fourth step 74, corresponding to an intermediate geographical point 56 in FIG. 5, the control unit 24 starts to control the auxiliary load 25, 26 according to a high consumption mode, identical to the second step 62 of FIG. 6, such that the auxiliary load will attain a predetermined maximal level when the vehicle reaches the endpoint 52. Also the remaining fifth and sixth steps 75, 76 of the present control strategy are identical to the corresponding third and fourth steps 63, 64 of the previously described control strategy associated with FIG. 6. The present control strategy has the advantage of not controlling the auxiliary load 25, 26 according to a high consumption mode more than necessary to avoid increased energy losses that are caused by operating the auxiliary load in the high consumption mode, such as for example increased heat losses.

Figure 8:
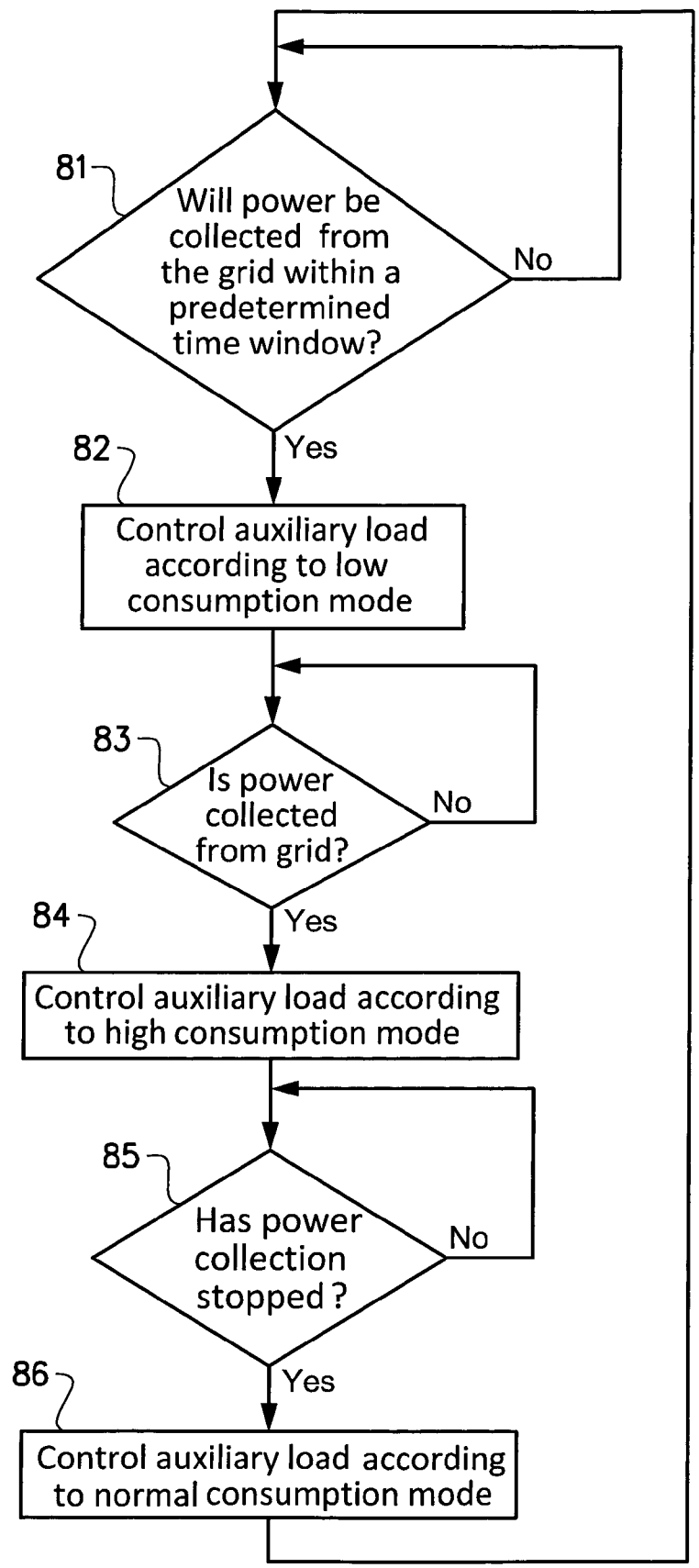

Another more complex but also more efficient control strategy is disclosed in FIG. 8 in conjunction with FIG. 5. The vehicle relative position determining means is also here able to determine vehicle position in relation to power supply track availability for a certain future time period. At a first step 81 of the control strategy, before the vehicle has reached the start point 51 of the power supply track section 53, where the vehicle is operating in the non-collecting mode and with the combustion engine 10 in an operating state, the control unit calculates an estimate time period remaining until the vehicle starts collecting power from the power supply track 2. The control unit 24 also compares this estimated time period with a predetermined time window. The predetermined time window can be different for each individual load, because each individual load has different operating characteristics. If power will be collected from the grid within the predetermined time window the control strategy goes to a second step 82 involving control of the auxiliary load 25, 26 according to low consumption mode. By delaying certain operation of the auxiliary load a certain time period until more low-cost electrical energy is available via the power supply track, a cost saving effect can be accomplished.

A low consumption mode may typically involve adjustment of the control parameters associated with each of the auxiliary loads 25, 26 to realise a temporarily lower energy consumption of the auxiliary load. For example, the temperature target level of the driver's cabin and/or a refrigerator compartment may be increased or decreased one or a few degrees, depending on the circumstances, such that the electrical motor driving the air conditioning unit and refrigeration unit exhibits at least a temporarily a decreased workload. The maximum air pressure level of the compressed air tanks that triggers end of operation of the air compressor during refill of the air tanks may be decreased, and refill may possibly be delayed if no safety risk is incurred, such that the electrical machine driving the air compressor pump exhibits at least a temporarily a decreased workload. Also the maximum charge level of a hydraulic accumulator may be decreased, and charging of the hydraulic accumulator by means of the electrical motor may possibly be delayed if no safety risk is incurred, such that an electrical motor driving a hydraulic pump for charging the hydraulic accumulator exhibits at least a temporarily increased workload. Electrical heating functions that are currently intermittently or continuously operating may be adjusted to have a lower target value.

Upon reaching the first geographical point 51 and upon determining availability of the power supply track 2 the control unit 24 will in a third step 83 determine that electrical power is collected from the power supply track 2 using the power collector 3. As a result, the control unit 24 controls the combustion engine 10 to stop and use of the electrical traction machine 13 for propulsion, as well as entering a fourth step 84 of the control strategy. The fourth to sixth step 84, 85, 86 of the strategy are identical to the second to fourth steps 62, 63, 64 of the control strategy disclosed in the context of FIG. 6, and reference is given to that text.

Reference signs mentioned in the claims should not be seen as limiting the extent of the matter protected by the claims, and their sole function is to make claims easier to understand. As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. Energy management system for a hybrid electric or electric vehicle comprising an electrical power collector adapted to intermittently collect electrical power from an external power supply track during driving of the vehicle, the energy management system is arranged to distribute electrical power from the electrical power collector to at least one electrical auxiliary load of the vehicle when collecting electrical power from the external power supply track, wherein the energy management system comprises a control unit configured to control operating characteristic of the at least one auxiliary load when the vehicle operates in a power collecting mode, in which electrical power is collected from the external supply track during driving of the vehicle, and when the vehicle operates in a non-power collecting mode, in which electrical power is not collected during driving of the vehicle, wherein the energy management system comprises vehicle relative position determining means that is arranged to determine the vehicle position in relation to power supply track availability, and the energy management system is arranged to, when the vehicle operates in a power collecting mode:

calculate an estimated first time period required for charging an energy storage device associated with the at least one electrical auxiliary load of the vehicle to a predetermined maximal level;

estimate a second time period until the power collector will disconnect from the external power supply track based on the determined vehicle position in relation to an end point of power supply track, and compare the first and second time periods, and, when the first time period is larger than the second time period, the control unit is arranged to increase the total power consumption level of the at least one auxiliary load, compared with the total power consumption level of the at least one auxiliary load when operating the vehicle in corresponding circumstances in the non-power collecting mode, such that the associated energy storage device will attain, the predetermined maximal level at the time of disconnection from the external power supply track;

wherein the energy storage device comprises an air storage tank and is charged by filling the air storage tank with compressed air, or comprises an hydraulic accumulator and is charged by filling the hydraulic accumulator with pressurised hydraulic fluid, or comprises a cargo refrigerator compartment and is charged by, lowering the temperature of the cargo refrigerator compartment, or comprises the temperature in a driver's cabin and is charged by increasing or decreasing the temperature of the driver's cabin depending on the circumstances.

2. The energy management system according to claim 1, wherein the vehicle relative position determining means comprises any of a global positioning system in combination with geographical power supply track installation information, a dedicated short-range communication system (DSRC) for communication with the power supply track installation, or radio-frequency identification (RFID) technology or similar transmitter/responder technology for determining the availability of power supply track at present vehicle position.

3. The energy management system according to claim 1, wherein the control unit is configured to estimate a time period until the electrical power collector will start collecting electrical power based on determined vehicle position in relation to a start point of power supply track.

4. Energy management system according to claim 3, wherein control unit is configured to control operating characteristic of the at least one auxiliary load when the estimated time period until the electrical power collector will start collecting electrical power from the external power supply track is within a predetermined time window.

5. Energy management system according to claim 3, wherein the control unit is configured to decrease the total power consumption level of the at least one auxiliary load when, the estimated time period until the electrical power collector will start collecting electrical power from the external power supply track is within a predetermined time window, compared with the total power consumption level of the at least one auxiliary load when operating the vehicle in corresponding circumstances outside the predetermined time window.

6. The energy management system according to claim 1, wherein the control unit is arranged to prioritise supply of electrical energy from the electrical power collector to an electrical traction machine of the vehicle, and to limit the supply of electrical energy from the electrical power collector to the at least one electrical auxiliary load to prevent that a maximal permitted power transmission level of the power collector or a maximal permitted electrical load level of the power supply track is exceeded.

7. The energy management system according to claim 1, wherein the electrical auxiliary load is formed by an electrical heating device for heating an electrical storage system, a driver's cabin, a vehicle seating, a vehicle window, a vehicle steering wheel, or a vehicle side mirror.

8. The energy management system according to claim 1, wherein the one electrical auxiliary load is formed by an electrical machine driving an air compressor unit/pump.

9. The energy management system according to claim 1, wherein the one electrical auxiliary load is formed by an electrical machine driving a compressor unit of a vehicle air conditioning system.

10. The energy management system according to claim 1, wherein the one electrical auxiliary load is formed by a vehicle electrical power take-off for operating at least one electrical load.

11. The energy management system according to claim 1, wherein the one electrical auxiliary load is formed by an electrical machine driving a water cooling system or air cooling system of the vehicle.

12. The energy management system a cording to claim 1, wherein the one electrical auxiliary load is formed by an electrical machine driving a hydraulic pump of a hydraulic system.

13. The energy management system according to claim 1, wherein the hydraulic system comprises a hydraulic motor for propulsion of the vehicle, a hydraulic cylinder for operating an implement of the vehicle, a hydraulic cylinder for steering of an articulated vehicle, or a hydraulic accumulator for temporarily storing hydraulic energy.

14. The energy management system according to claim 1, wherein the electrical power collector is arranged to collect electrical power while being in sliding contact with an electrical conductor of the power supply track, or by inductive coupling between the electrical power collector and the power supply track.

15. Method for controlling operating characteristic of at least, one auxiliary load of a hybrid electric or electric vehicle comprising an electrical power collector for intermittently collecting electrical power from an external power supply track during driving of the vehicle, wherein electrical power may be distributed from the electrical power collector to the at least one electrical auxiliary load of the vehicle when collecting electrical power from the external power supply track, the method comprising the steps of
  determining when the vehicle operates in a power collecting mode, in which electrical power is collected from the external supply track during driving of the vehicle, and when the vehicle operates in a non-power collecting mode, in which electrical power is not collected during driving; and
  controlling operating characteristics of the at least one auxiliary load when the vehicle operates in the power collecting mode or in the non-power collecting mode;
  comprising, when the vehicle is in the power collecting mode:
  determining vehicle position in relation to the power supply track;
  calculating an estimated first time period required for charging an energy storage device associated with the at least one electrical auxiliary load of the vehicle to a predetermined maximal level;
  estimating a time period until the power collector will disconnect from the external power supply track based on the determined vehicle position in relation to an, end point of the power supply track;
  comparing the first and second time periods, and, when the first time period is larger than the second time period,
  increasing the total power consumption level of the at least one auxiliary load when operating the vehicle in the power collecting mode, compared with the total power consumption level of the at least one auxiliary load when operating the vehicle in corresponding circumstances in the non-power collecting mode, such that the associated energy storage device will attain the predetermined maximal level at the time of disconnection from the external power supply track;
  wherein the energy storage device comprises an air storage tank, and the charging, of the energy storage device comprises filling the air storage tank with compressed air, or the energy storage device comprises an hydraulic accumulator and the charging of the energy storage device comprises filling the hydraulic accumulator with pressurised hydraulic fluid, or the energy storage device comprises a cargo refrigerator compartment and the charging of the energy storage device comprises lowering the temperature of the cargo refrigerator compartment, or the energy storage device comprises a driver's cabin, and the charging of the energy storage device comprises increasing or decreasing the temperature of the driver's cabin depending on the circumstances.

16. Method according to claim 15, comprising the step of estimating a time period until the electrical power collector will start collecting electrical power based on determined vehicle position in relation a to start point of the power supply track.

17. Method according to claim 16, comprising the step of controlling operating characteristic of the at least one auxiliary load when the estimated time period until the electrical power collector will start collecting electrical power from the external power supply track is within a predetermined time window.

18. Method according to claim 16, comprising decreasing the total power consumption level of the at least one auxiliary load when the estimated time period until the electrical power collector will start collecting electrical power from the external power supply track is within a predetermined time window, compared with the total power consumption level of the at least cane auxiliary load when operating the vehicle in corresponding circumstances outside the predetermined time window.

19. Method according to claim 15, comprising the step of prioritising supply of electrical energy from the electrical power collector to an electrical traction machine the vehicle, and limiting the supply of electrical energy from the electrical power collector to the at least one electrical auxiliary load to prevent that a maximal permitted power transmission level of the power collector or a maximal permitted electrical load level of the power supply track is exceeded.

20. Method according to claim 15, comprising the step of collecting electrical power using the electrical power collector while being in sliding contact with an electrical conductor of the power supply track, or by inductive coupling between the electrical power collector and the power supply track.

\* \* \* \* \*